US008065328B2

(12) United States Patent
Strandel et al.

(10) Patent No.: US 8,065,328 B2
(45) Date of Patent: *Nov. 22, 2011

(54) SHARING OF MEDIA USING CONTACT DATA

(75) Inventors: Toni Strandel, Helsinki (FI); Davin Wong, Helsinki (FI); Tuomas Tammi, Helsinki (FI)

(73) Assignee: Nokia Corporation, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 12/582,376

(22) Filed: Oct. 20, 2009

(65) Prior Publication Data

US 2010/0042717 A1 Feb. 18, 2010

Related U.S. Application Data

(63) Continuation of application No. 11/703,440, filed on Feb. 7, 2007, now Pat. No. 7,627,608.

(51) Int. Cl.
*G06F 7/00* (2006.01)
*G06F 17/30* (2006.01)

(52) U.S. Cl. ........................ 707/781; 709/217

(58) Field of Classification Search .................. None
See application file for complete search history.

(56) References Cited

U.S. PATENT DOCUMENTS

| 2002/0016818 A1 | 2/2002 | Kirani et al. |
| 2005/0052685 A1 | 3/2005 | Herf et al. |
| 2005/0266835 A1 | 12/2005 | Agrawal et al. |
| 2006/0271688 A1 | 11/2006 | Viger et al. |
| 2006/0280166 A1* | 12/2006 | Morris ........................ 370/352 |
| 2007/0220563 A1 | 9/2007 | Wu |
| 2007/0276862 A1 | 11/2007 | Toutonghi |
| 2008/0140664 A1 | 6/2008 | Hao et al. |

FOREIGN PATENT DOCUMENTS

| WO | WO 2005/004005 | 1/2005 |
| WO | WO 2005/017660 | 2/2005 |
| WO | WO2005111849 | 11/2005 |

OTHER PUBLICATIONS

Multiply, Inc., tutorials printed from www.multiply.com, printed from internet on Feb. 7, 2007.
Office action with translation dated May 20, 2011 from Korean Application No. 10-2009-7018519, 9 pages.

* cited by examiner

*Primary Examiner* — Uyen T. Le
(74) *Attorney, Agent, or Firm* — Hollingsworth & Funk, LLC

(57) ABSTRACT

Media sharing using contact data involves identifying contact records on a personal electronic device of a user. Each of the contact records includes a contact address of a person associated with the respective contact record. The contact records are communicated to a media sharing service via a network. Media items of the user are sent to the sharing service. One or more of the contact records are associated with each of the media items. A notification is sent to the persons associated with the one or more contact records. The notification describes sharing of the media items associated with the contact records. The sharing service facilitates access to the media items by the persons associated with the contact records in response to the persons receiving the notification.

20 Claims, 11 Drawing Sheets

SHARING OF MEDIA USING CONTACT DATA

CROSS-REFERENCE TO RELATED APPLICATIONS

This is a continuation of application Ser. No. 11/703,440, filed Feb. 7, 2007, which has issued as U.S. Pat. No. 7,627,608 on Dec. 1, 2009, the content of which is incorporated herein by reference in its entirety.

FIELD OF THE INVENTION

This invention relates in general to computing devices, and more particularly to sharing of media to computer network users.

BACKGROUND OF THE INVENTION

The use of networks is constantly evolving. Network applications such as email, instant messaging, and Web browsers have been combined and adapted in ways that allow users to communicate ever more effectively with people around the globe. In the early days of electronic communications, a person generally communicated electronic communication identifiers (e.g., email addresses) to those individuals with whom the person already had a preexisting relationship. Those identifiers were usually communicated using alternate communications channels. For example, when a person set up their first-ever email account, they usually had to manually input all of the email addresses of those people with whom they wish to communicate. Those email addresses were likely communicated to the person by means other than email, such as verbally, printed on a business card, etc. These alternate communication methods (e.g., print media or verbal communications) were also used by the same person to distribute their newly acquired email address to others who either did not have email or whose address was not known by the person.

Because of the increasing use of the World Wide Web and Internet search engines, many people are able to establish communications with others with whom there are no previous relationships, and can gather addresses for those communications electronically. For example, an Internet search on a particular subject might lead to an authoritative Web page. A person browsing that Web page might find an email address of the author, such as by viewing a "mailto:" hyperlink. By clicking on the link, the viewer can automatically launch an email client, draft a communication to the author, and add the author's address to their personal contacts list. Thus the Web and search engine not only facilitated the viewing of the particular page, but facilitated the creation of a two way communication channel, and did so in a way that was speedier and more convenient that traditional means (e.g., face-to-face meetings, written publications, etc.)

This ability to instantly connect to others having similar interests has been refined by the implementation of Internet groups. These groups, such as Yahoo!® Groups, are Web sites dedicated to particular subjects of interest. One person establishes a group, and can send out invitations to others inviting them to join. Where the group relates to a common interest, it can be made public, and anybody can find and join the group. Group content (e.g., messages, documents, images) can be posted by members, and newly posted messages and content can be automatically distributed to registered group members, such as via email.

Although these types of Internet groups have many advantages, there are some disadvantages. For example, in order to participate in the group, one must be a registered member of the service provider that is hosting the group. For many people already juggling innumerable other network accounts that each require a username/password combination, the addition of yet another account is seen as too high a price to pay in order to participate in a group. This disadvantage is especially apparent with small private groups, where participation by all members is more important than exposure of the group to others in the public who might want to contribute. Further, if there is a lot of activity in the group, the large amount of messages (e.g., emails, instant messages) may be an annoyance to some people, and cause them to withdraw from the group. The present disclosure addresses these and other shortcomings of currently implemented network communications.

SUMMARY OF THE INVENTION

The present invention discloses a system, apparatus and method for sharing media using contact data. In one embodiment, a method involves identifying contact records on a personal electronic device of a user. Each of the contact records includes a contact address of a person associated with the respective contact record. The contact records are communicated to a media sharing service via a network. The persons associated with the respective contact record are not previously registered with the service. The media items of the user are sent to the sharing service, and one or more of the contact records are associated with each of the media items. A notification is sent to the persons associated with the one or more contact records. The notification describes sharing of the media items associated with the contact records. The sharing service facilitates access to the media items by the persons associated with the contact records in response to the persons receiving the notification.

In more particular embodiments, the notification contains an access code unique to each person receiving the notification, and the sharing service facilitates access to the media based on the access code. The access code may remain associated with the user receiving the notification for subsequent access of the media items via the sharing service. In one particular embodiment, sending the notifications to the persons associated with the one or more contact records comprises involves the notifications to the contact addresses of the respective contact records.

In other, more particular embodiments, the method further involves comparing the contact records via the sharing service with contact records submitted by other users to identify persons having contact information in the contact records of two or more of the users. In such a case, the method may involve creating aggregated contact records for any persons having contact information in the contact records of two or more of the users. The aggregated records may be formed by combining the contact records of the two or more users. In one arrangement, the aggregated contact records each include two or more contact addresses, and sending the notification to the persons associated with the aggregated contact records involves a) choosing the least disruptive of the two or more contact addresses, and b) sending the notification to the least disruptive addresses.

In other, more particular embodiments, the method involves facilitating registration of the persons who are sent the notifications that describe sharing of the media items. Facilitating registration may involve presenting to the persons electronic forms that are pre-filled with the contact information of the respective persons. In another variation, the method may also involve modifying the contact addresses of the contact records submitted to the media sharing services so that the modified contact addresses are globally unique.

In another embodiment of the invention, an apparatus includes a network interface capable of being coupled to a network. A persistent data storage of the apparatus contains one or more media items and contact records of a user of the apparatus. Each of the contact records includes a contact address of a person associated with the respective contact record. A processor coupled to the network interface and the persistent data storage, and memory is coupled to the processor. The memory has instructions that cause the processor to associate the contact records with the media items and communicate the contact records and media items to a media sharing service via the network. The persons associated with the contact records are not previously registered with the service. The instructions further cause the processor to facilitate sending of a notification to the persons associated with the one or more contact records via the media sharing service. The notifications describe sharing of the media items associated with the contact records and facilitate access to the media items via the sharing service by the persons associated with the contact records.

In more particular embodiments, the apparatus includes a transducer coupled to the processor, and the instructions further cause the processor to record the media items from the transducer and place the recorded media items into the persistent storage. In such a case, the apparatus may also include a user interface coupled to the processor. The instructions further cause the processor to prompt the user, via the user interface, to associate the contact records with the media items and communicate the contact records and media items to the media sharing service via the network in response to recording the media items.

In another embodiment of the invention, a server apparatus includes a network interface capable of being coupled to a network and a processor coupled to the network interface. Memory is coupled to the processor and has instructions that cause the processor to receive, via the network, contact records on from personal electronic devices of users. Each of the contact records includes a contact address of a person associated with the respective contact record, and the persons associated with the contact records are not previously registered with sharing services provided by the server apparatus. The instructions cause the processor to receive media items from the users. Each of the media items is associated with one or more of the contact records. The instructions cause the processor to send, via the network, notifications to the persons associated with the one or more contact records associated with each of the media items, where such notifications describe sharing of the media items. The instructions cause the processor to facilitate access to the media items via the network by the persons associated with the contact records in response to the persons receiving the notifications.

In more particular embodiments, the notifications each contains an access code unique to the person receiving the notification, and access to the media is facilitated based on the access code. In one configuration, the instructions further cause the processor to compare the contact records submitted by different users to identify persons having contact information in the contact records of two or more of the users. In such a case, the instructions may further cause the processor to create aggregated contact records for any persons having contact information in the contact records of two or more of the users. The aggregated records are formed by combining the contact records of the two or more of the users. Further, the aggregated contact records may each include two or more contact addresses, and sending the notification to the persons associated with the aggregated contact records involves a) choosing the least disruptive of the two or more contact addresses, and b) sending the notification to the least disruptive addresses.

In other, more particular embodiments, the instructions further cause the processor to facilitate registration, via the network, of the persons who are sent the notifications that describe sharing of the media items. Facilitating registration may involve presenting to the persons electronic forms that are pre-filled with the contact information of the respective persons. In other configurations, the instructions further cause the processor to modify the contact addresses of the contact records submitted to the media sharing services so that the modified contact addresses are globally unique.

In another embodiment of the invention, a computer-readable storage medium has instructions which are executable by an apparatus capable of being coupled to a network for performing steps that involve storing in a persistent data storage of the apparatus, one or more media items and contact records of a user of the apparatus. Each of the contact records includes a contact address of a person associated with the respective contact record. The steps also involve associating the contact records with the media items and communicating the contact records and media items to a media sharing service via the network. The persons associated with the contact records are not previously registered with the service. The steps also involve facilitating sending of a notification to the persons associated with the one or more contact records via the media sharing service, wherein the notification describes sharing of the media items associated with the contact records, wherein the notifications facilitates access to the media items via the sharing service by the persons associated with the contact records.

In more particular embodiments, the steps further involve recording the media items from a transducer of the apparatus and storing the recorded media items into the persistent storage in response to the recording. In such a case, the steps may further involve prompting the user, via a user interface of the apparatus, to associate the contact records with the media items and communicate the contact records and media items to the media sharing service via the network in response to recording the media items.

In another embodiment of the invention, a computer-readable storage medium has instructions which are executable by an apparatus capable of being coupled to a network for performing steps that involve receiving, via the network, contact records from personal electronic devices of users. Each of the contact records includes a contact address of a person associated with the respective contact record, and the persons associated with the contact records are not previously registered with sharing services provided by the apparatus. The steps further involve receiving, via the network, media items from the users. Each of the media items is associated with one or more of the contact records. The steps further involve sending, via the network, notifications to the persons associated with the one or more contact records associated with each of the media items and facilitating access to the media items via the network by the persons associated with the contact records in response to the persons receiving the notifications.

In another embodiment of the invention, a system includes means for identifying contact records on personal electronic devices of users. Each of the contact records includes a contact address of a person associated with the respective contact record. The system also includes means for associating one or more of the contact records with media items and means for sending a notification to the persons associated with the one or more contact records. The notification describes sharing of the media items associated with the contact records. The system also includes means for facilitating access to the media items by the persons associated with the contact records in response to the persons receiving the notification.

In more particular embodiments, the system further includes means for creating aggregated contact records for any persons having contact information in the contact records of two or more of the users. The aggregated records are formed by combining the contact records of the two or more of the users. In such a case, the aggregated contact records may each include two or more contact addresses, and the system may further include means for choosing the least disruptive of the two or more contact addresses, and means for sending the notification to the least disruptive addresses.

In other, more particular embodiments, the system further includes means for modifying the contact addresses of the contact records so that the modified contact addresses are globally unique. The system may also include means for registering, via a network, of the persons who are sent the notifications that describe sharing of the media items. The registration involves using electronic forms that are pre-filled with the contact information of the respective persons.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of systems, apparatuses, and methods in accordance with the invention.

BRIEF DESCRIPTION OF THE DRAWINGS

The invention is described in connection with the embodiments illustrated in the following diagrams.

DETAILED DESCRIPTION OF EMBODIMENTS OF THE INVENTION

Figure 1:
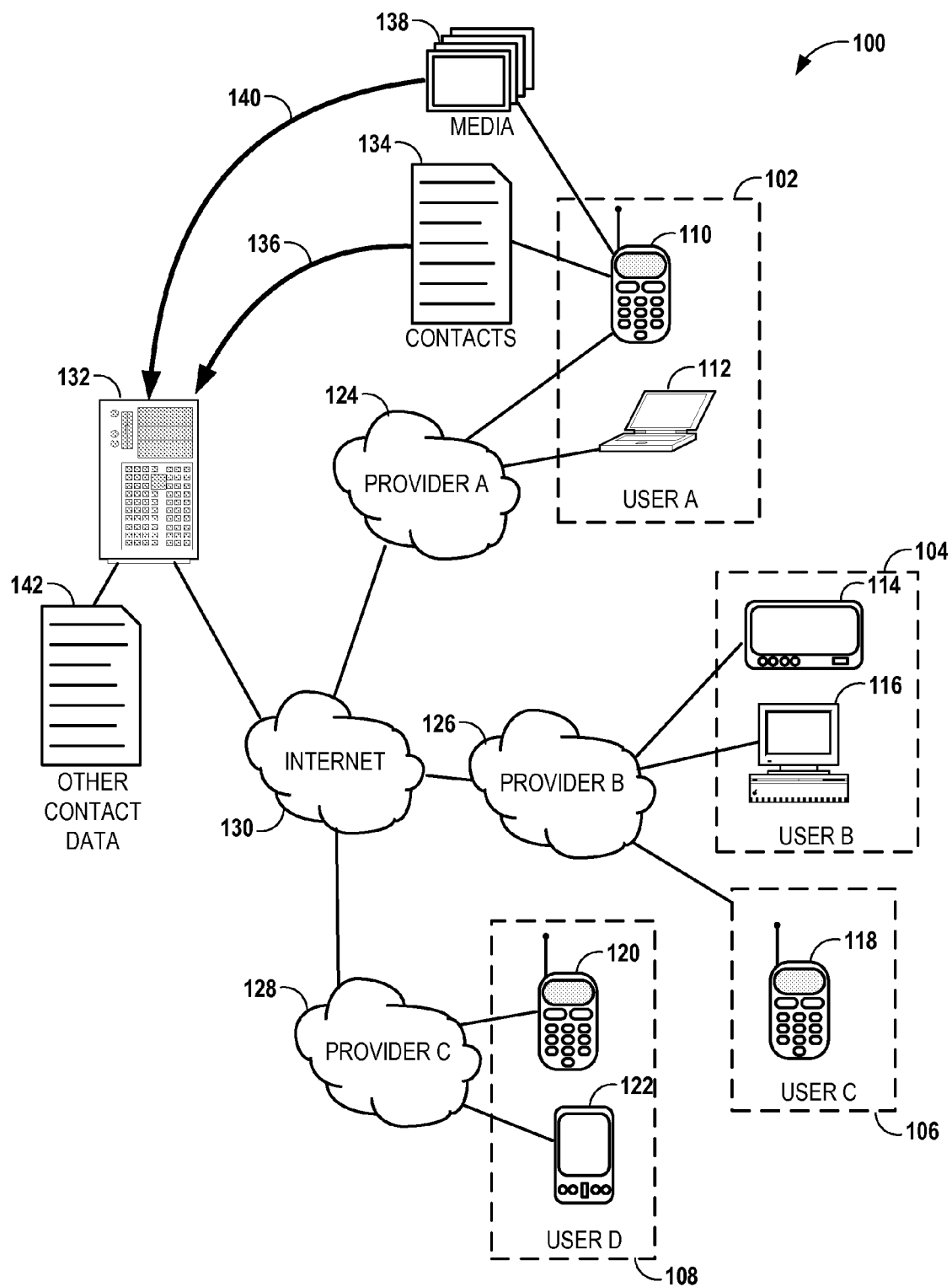
FIG. 1 is a block diagram illustrating a system according to embodiments of the invention.

In the following description of various exemplary embodiments, reference is made to the accompanying drawings that form a part hereof, and in which is shown by way of illustration various embodiments in which the invention may be practiced. It is to be understood that other embodiments may be utilized, as structural and operational changes may be made without departing from the scope of the present invention.

Generally, the present invention relates to methods, systems, and apparatus for creating a group of users for sharing Web-based content and services. The contact information stored in the users' communication devices can be used to form these groups. For example, the data stored in a phonebook on a user's mobile device can be used to create a list of communication identifiers. Shared media items can be sent to these identifiers so that the user can view or otherwise use the item. In other arrangements, the users may receive data that allows them to access the shared media items on a continuing basis without requiring registration with a particular provider.

It is often the case that users desire to share media items to a restricted set of people in a controlled matter. They want to define who sees which media items. This usually requires the person being invited to access a shared item to first register with the system. Alternatively, the invitee may receive multiple pass codes that may allow access to (often time restricted) accounts. The invitee then needs to keep track of the pass codes to return to some specific items. This becomes even more problematic where the person sharing wishes to create a group of users to the system to repeatedly share media items with.

Even when there is no issue with registration and/or pass codes, continuous notifications from newly shared media items might become very disruptive for a person, especially if the notifications are sent to his or her mobile device. Certain mobile device message notifications, such as phone calls and instant messages, can be disruptive. As a result, the users of these devices often wish that only communications that require immediate attention use those types of notifications.

Typically the users being shared to need to register to a system in order to see the items shared to them. Registering to a system requires one to enter information, such as name, phone number, email address, even though this information may already be known by the system. Alternatively, invitees may be sent a cryptic URI or pass code to login to the system to see the media items in the single sharing event. To see media items shared in another event, they are sent a different pass code/cryptic URI. Alternatively, access to media items shared in one event are protected with a username and/or password that is then distributed to selected people. Usually there is no access control in this latter case, however.

To more facilitate easier sharing of media to selected persons, the present disclosure is directed to systems, apparatus, and methods that allow people to upload contacts to a Web service to be used to share media items with. The person being shared to can see all media shared to him by the same person using a single pass code. The person being shared to can see all media shared to him by multiple persons using the same, single pass code. As such, a group of people (both registered and un-registered) can be persistently associated with a network service entity that is used to repeatedly share media items with the group. Further, a person may be able to select the least-disruptive notification method from aggregated contact information collected from current users' contacts. In one arrangement, the aggregated contact information may be used to pre-fill a registration form to register to a service.

In reference now to FIG. 1, a system 100 according to an embodiment of the invention is illustrated. The system 100 provides means for a number of users 102, 104, 106, 108 to share electronic media and/or have such media shared with them. The users 102, 104, 106, 108 have at least one electronic device that they may use to receive or access this media. User 102 may access media using a mobile phone 110 or laptop computer 112. User 104 may access media using a desktop computer 116 and/or a mobile computing device 114 such as a personal digital assistant (PDA) or ultra-mobile computer. Users 106 and 108 can also access media via respective mobile phones 118, 120, and user 108 may also use a mobile device 122 such as a portable game console and/or music player. It will be appreciated that this list of devices is provided for purposes of example, and media may be provided to users of the system 100 using any device known in the art. Further, as will be explained below, some users may not require electronic devices at all to participate in some aspects of media sharing as described herein.

As is typical with a diverse group of users, the users 102, 104, 106, 108 in the illustrated system 100 may use different network service providers. In particular, user 102 uses provider 124, users 104 and 106 use provider 126, and user 108 uses provider 128. These providers 124, 126, 128 may include any combination of Internet Service Provider (ISP), other network service provider (e.g., email, Web hosting, etc.), mobile services provider (e.g., mobile phone service, instant messaging, multimedia messaging) and other types of electronic services known in the art. The providers 124, 126, 128 are all generally accessible via the Internet 130, although depending on the end user device and service, access features may be different between users. For example, user 106 may have a service contract that allows his device 118 to receive instant messages (IM) and multimedia messages (MMS), but does not include browsing capability or email access.

In one scenario, user 102 may wish to share media that is network accessible by all users 102, 104, 106, 108, such as by placing the media on Internet server 132. The server 132 may be part of provider network 124, or some other, independent service provider. The user 102 maintains contact information about the other users 104, 106, 108 on one of the user's devices 110, 112, such as via contacts list 134. The user 102 can share media items to these others 104, 106, 108 in his contact list 134, without knowing or needing to know whether the others 104, 106, 108 are also registered users of the service 132 or not. In this way, the user 102 can easily leverage the locally stored contact list 134 to create a service that can be shared by those others in the list 134.

To allow sharing of content to the other users 104, 106, 108, the user's contact information 134 is uploaded 136 to the server 132. The users' media items 138 are also uploaded 140 to the server. The respective uploading 136, 1140 of contact data 134 and media 138 can occur from the same or different devices 110, 112, and may occur at the same or different times. Once uploaded, the contact information 134 can be matched to and/or aggregated with other contact information 142 that may be available on the server 132. For example, one or more of the other users 104, 106, 108 may have also uploaded contact information 142 to the server 132 for some of the contacts. The contact information 134, 142 can be matched by looking at, for example, phone numbers and email addresses present in the contact information 134, 142.

After the users' media items 138 are uploaded to the server, the user 102 can then share the media items to the people present in the contact list 134, either by using mobile device 110 or accessing a Web based UT via any of the user's devices 110, 112. If a person being invited to access the shared content is a registered user of the system 100, the invitee can see the shared items e.g. by logging in to the server 132. If the invitee is not a registered user of the system 100, the invitee is sent a notification of the new shared media items. The invitee has an account created without explicit registration and is sent a pass code to access the account. Using the pass code, the invitee can see all the media shared by potentially multiple users. This is possible because of the network created from users' contact information 134, 142 uploaded to the server 132 and matched by unique identifiers such as phone numbers and email addresses. The user 102 that is sharing the media items 138 can create a group of contacts on their own, and share media items with the group repeatedly. The group can include people that are both registered and unregistered with the sharing service 132.

After the groups have been setup, each participant is sent a notification of each sharing event. This event could be the addition of new content, modification of existing content, change in group data (e.g., group name), and similar types of data transactions. The recipients may have the option of disabling such notifications. Alternatively, the recipient may be able to select the least disruptive communication method for notifications. For example, user U1 has a contact entry C1 pointing to person P, and user U2 has a contact entry C2 pointing to the same person P. C1 contains P's mobile phone number, and C2 contains both P's mobile phone number and email address. Both U1 and U2 use the same sharing service. When U1 e.g. shares media items to P, P receives a Simple Message Service (SMS) notification message of new shared media. If U2 e.g. would share media to P, P would receive an email notification message instead of SMS, as email is generally considered less interruptive than SMS.

In this scenario, when P receives the notification SMS caused by U1's sharing of media, P may be able to access the sharing service to see the shared items, and may be offered a choice to select the preferred (or least disruptive) way to receive all future notifications, e.g. via email (or SMS if he so wishes). Because U1 and U2 use the same sharing service, the service may be able to correlate the contact entries C1 and C2. As such, the sharing between U1 and P can benefit from U2's contact information related to P. This may be the case even if U2 has never shared media to P, so long as U2's contact data has been uploaded to the service.

Once the sharing service has P's email address, P can choose to receive notification messages via only email, and have this apply to any future sharing events and/or users. For example, if now U3 becomes a user of the system, her contacts are matched to existing ones. U3 has contact entry C3, containing a mobile phone number that points to same person P. If now any of the users U1, U2 or U3 shares media to P, the notification is sent as an email message, even though U1 and U3 do not have the email address of P.

There are additional advantages to correlating and aggregating user contact information this way. If P is not a member of the service, but after viewing shared content decides to join, then P will typically have to fill in some personal information, and in particular contact information. However, as the system already has some information on P because of U1, U2, and U3's contact data being aggregated, the aggregated contact information can be used to pre-fill a registration form. Continuing the above example, if P wants to register to the system, the aggregated contact information from users' U1, U2 and U3 phonebooks is used to pre-fill P's information to the registration form.

Even though media sharing is used here as an example use case, the concepts described can be applied equally well to any system capable of sending notifications to people based on contact information provided by other users. Similarly, although examples presented are of email and SMS messages notifications, it will be appreciated that these notification can used with any other communication method that may be described via a contacts entry, including instant messaging, paging, fax, voice mail, postal mail, etc.

Figure 2:
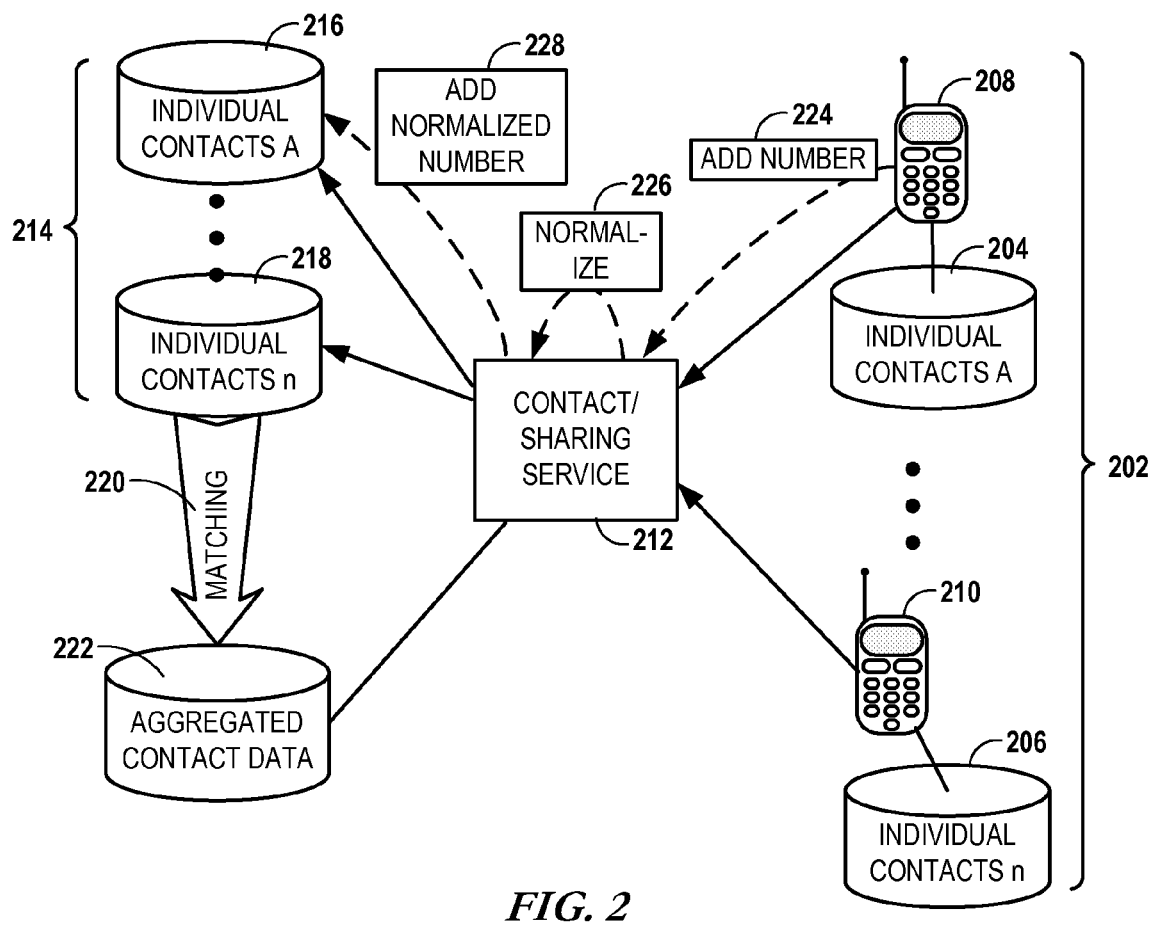
FIG. 2 is a block diagram illustrating normalizing and aggregating contact data according to an embodiment of the invention.

In reference now to FIG. 2, a block diagram illustrates an example arrangement used for contact data storage and correlation according to an embodiment of the invention. In this example, a plurality of mobile terminals 202 each has an associated contacts database (e.g., databases 204, 206 associated with individual terminals 208, 210). The terminals 202 are registered or otherwise associated with a contacts/sharing service 212. The service 212 may provide, for example, a network accessible location to store and maintain contacts and other account information, as well as acting as a portal for storing media and other shareable data.

As part of using the contacts/sharing service 212, the users of the terminals 202 will have their contact data stored on a remote database 214. In the illustrated database, an individual data set 216, 218 mirrors each of the individual contact databases 204, 206. The mirrored data 216, 218 may be uploaded to the service via the respective terminals 208, 210. Conversely, the users may be able to create the mirrored data 216, 218 via the service 212 first (e.g., by using a Web interface of the service 212) and then download this contact data to the terminals 210, which use the data to populate the contact databases 204, 206.

Regardless of how the data sets 204, 206, 216, 218 are initially created, after some time the user may modify the data at either one (or both) of the terminals 202 and/or database 214. Therefore, the terminals 202, service 212, and/or database 214 may include features that allow synchronization of local contact databases (e.g., contacts 204, 206) and service database 214. For example, a synchronization protocol such as SyncML may be used to ensure data in the local data sets 202, 206 are the same as the associated data sets 216, 218 on the remote database 214. It may also be possible to use a Web server running on the mobile devices 202 to provide the contact data to the service 212.

The server-side database 214 may be implemented as a relational database, which acts as backend for the service 212. The service 212 may be Web-based, meaning that at least some aspects of the service may be accessed or controlled using common Web standards such as HTTP and HTML. The service 212 may also be configured as a Web Service, generally meaning that it includes particular methods/functions that can be invoked by another program using Web standard protocols and formats (e.g., XML over HTTP). In such a case, a client program running on one or more of the terminals 202 may be able to automatically manage the server-side contacts data 214 for an individual user by remotely invoking methods of a Web service. This management of the server-side data 214 may include synching data via a synchronization protocol, managing preferences, etc.

In addition to facilitating user management of the contacts data 214, the service 212 may also match 220 some of the contacts data 214 to form an aggregated database 222. The aggregated database 222 may include a set of records than is entirely separate from the individual contacts databases 214. In other arrangements, the aggregation data 222 could be used to create new instances of individual databases 214, or to augment individual instances of these databases 214.

The matching 220 of data may involve matching of records contained in individual ones of the user contact databases 214. This matching 220 of contact data may be done when a user registers and his/her contact data is retrieved and/or when a user enters a new contact or changes the information of an existing contact. In one arrangement, the contact matching algorithm may use phone numbers as a unique identifier for an individual contact record, e.g., a record that identifies a single person or entity. Telephone numbers are considered globally unique, at least when they include the country and area code. The matching 220 can also be done using other unique identifiers, including email addresses. These identifiers (e.g., phone number and email address) can be used alone or in combination.

The matching 220 of telephone numbers is not necessarily a trivial string match, because the country code is optional when calling within one country. Also, in some localities the first number of an area code may be dropped if the country code is present. In other localities, the area code is also optional when dialing from within that area code. Therefore, the service 212 that performs the matching 220 will need to take into account these potential variations on the use of country codes and area codes.

One approach to matching between different sets of contact data 214 is to "normalize" all numbers when they are entered in to the service 212, as such as indicated by processing paths 224, 226, 228. The numbers may be normalized 226, for example, by adding the country code to the beginning and modifying the area code accordingly. Phone numbers that are normalized 226 in this way may be used as unique identifiers when creating the network of users in the server 212. The normalization 226 can be done by the service 212, as illustrated, and/or the mobile device 208, if the device 208 knows its country code. If the normalization happens on the server 212, the mobile device 208 provides the server 212 with country of the user. The country information is available from the cellular network.

After the matching 220, multiple contact entries of the individual contact lists 214 may point to the same person, including a person who has not previously registered for or utilized the service 212. Note that during the matching 220 of records, many contact records may be encountered that don't have a match. This will be true for any contact records that are unique to only one of the contact records 214. Even so, the records may still be placed in an aggregated contact data 222 for future matching. If such a person in the aggregated contact data 222 is not currently a member of the service 212, the system may create an account for that person. This account creation may occur when the person's records are first entered into the service, and/or when a member of the service 212 shares to that person for the first time (unless that person is already a registered user of the system.) Thereafter, the person is sent a notification message of any sharing events. The sharing event message may include a Uniform Resource Identifier (URI) to the service 212, and a pass code to log in to the automatically created account.

Figure 3:
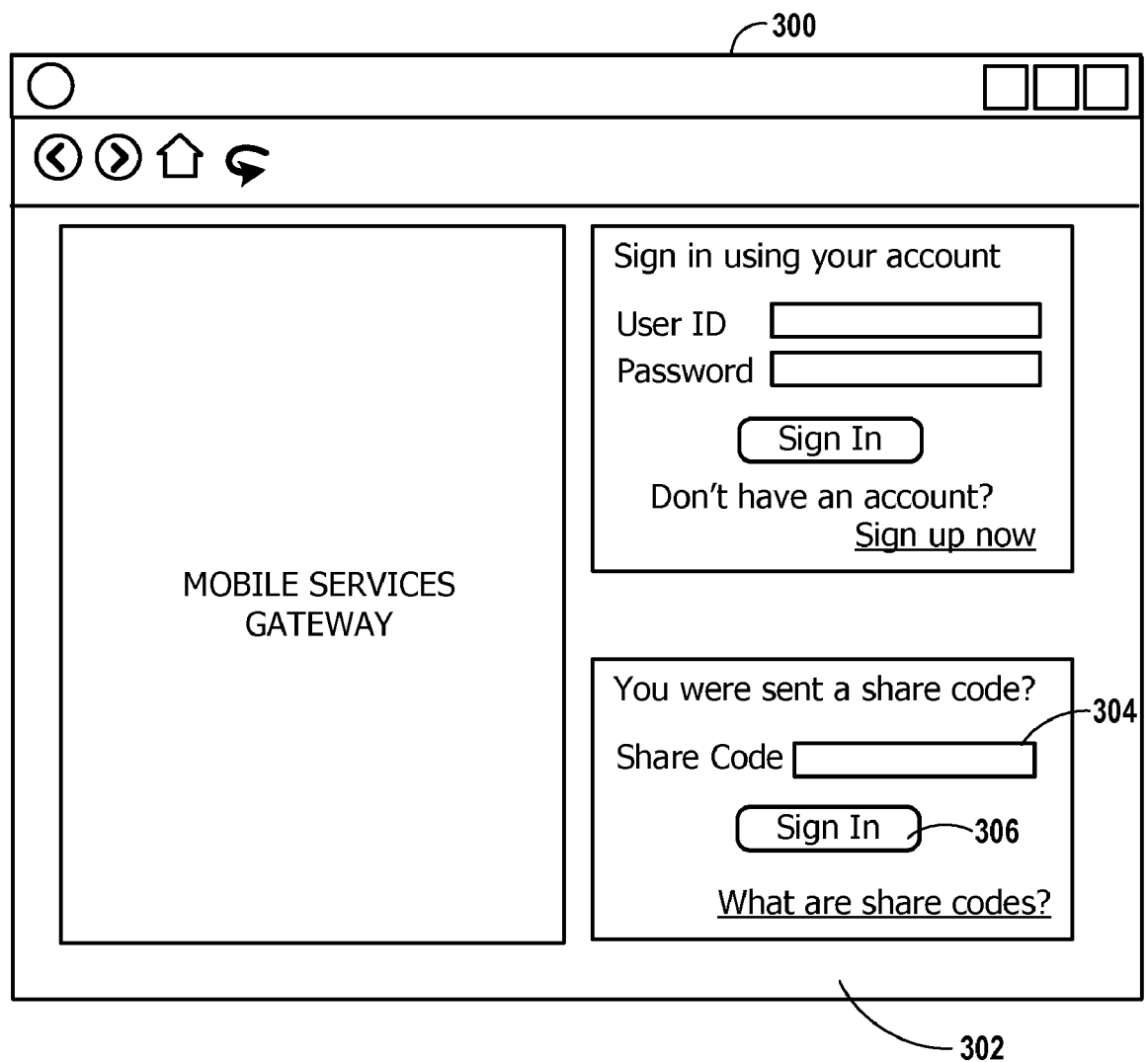
FIG. 3 is a diagram illustrating an access user interface for notification recipients according to an embodiment of the invention.

In reference now to FIG. 3, an example Web interface screen 300 shows how an unregistered user may access a sharing service according to an embodiment of the invention. The Web interface 300 includes a Web page content portion 302 that may be displayed in a browser or similar viewer. The Web page 302 may act as a gateway document to access the sharing service, as well as any other services of the provider. When new media items are shared to the person using one of the contact entries pointing to him or her, an account is created for the user and the shared items are attached to the account. The user then receives a sharing event notification via some mode of communication described in the contacts, such as an email address.

The sharing event notification may contain a URI of the page 302 and a pass code that may be entered in text box 304 of the Web page 302. By entering the pass code into the box 304 and selecting the "Sign In" button 306, the user can log into their automatically created account and see the newly shared media. If this is not the first time somebody has shared media to this person, the person will also see all other media previously shared to him/or her. Assuming that the system has correlated the receiving user to two or more different registered users, the user may access all shared media using the same pass code, even if the media originated from different people at different times. If the person decides to register to the system, the media shared to him is visible to him after the registration as well.

Figure 4A:
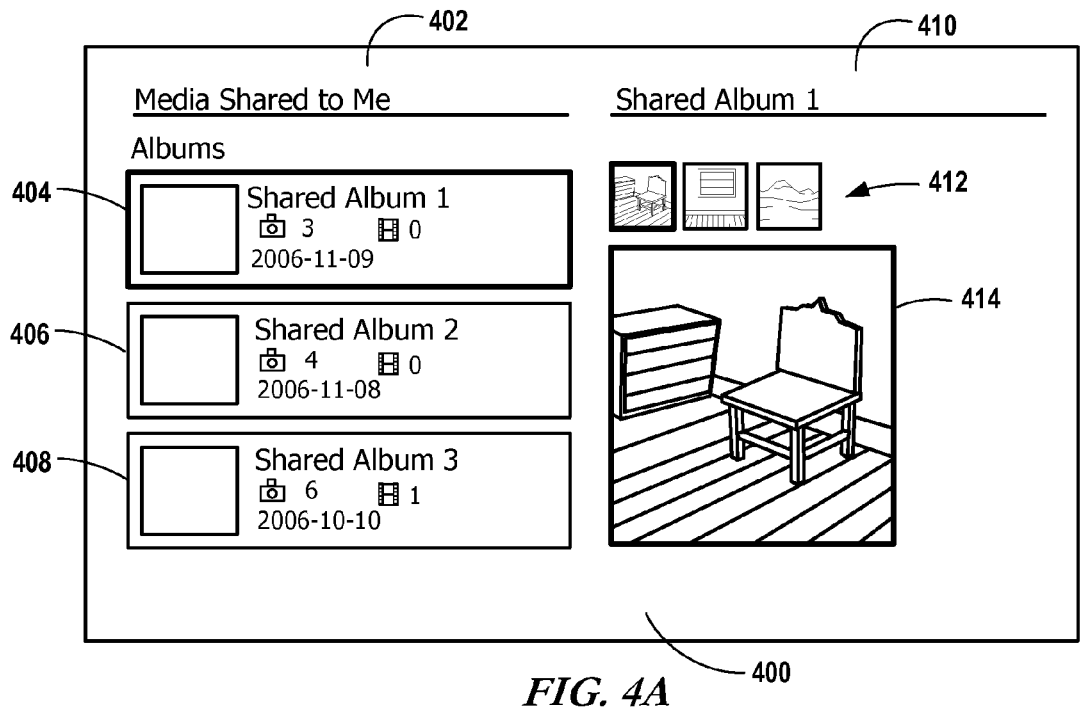
FIG. 4A is a diagram illustrating a shared media user interface according to an embodiment of the invention.

In reference now to FIG. 4A, a Web interface screen 400 shows an example view of media that is available after logging in with pass code according to an embodiment of the invention. All media shared to the person is visible in this screen 400. On the left pane 402, a number of albums 404, 406, 408 may be selected for viewing. In this example, album 404 has been selected, and media (e.g., electronic photos) can be seen in the right hand pane 410 using both thumbnail views 412 and a full view 414 of the currently selected thumbnail 412.

Note that the albums 404, 406, 408 may be arranged in various ways to suit the end user. As a default, the media shared by each user may be placed in an album associated with that user. In that case, each of the illustrated albums 404, 406, 408 would correspond to one other user who has shared media to this user. Other groupings of media may by displayed, either by default or user preference, including by date/time, metadata associated with the media, media type, provider network of the sharing person, etc.

In a sharing service according to embodiments of the invention, the user can create a group of contacts and label the group appropriately (e.g. friends, family). The user can then easily share media items to all the people in the group, without needing to know or care whether the individual people are registered users, or whether or not such others have received share invitations or shared items before. If the target recipients have not been offered to share media (or the recipients haven't otherwise been exposed to the system) the system can create an account for each un-registered contact in a group.

Figure 4B:
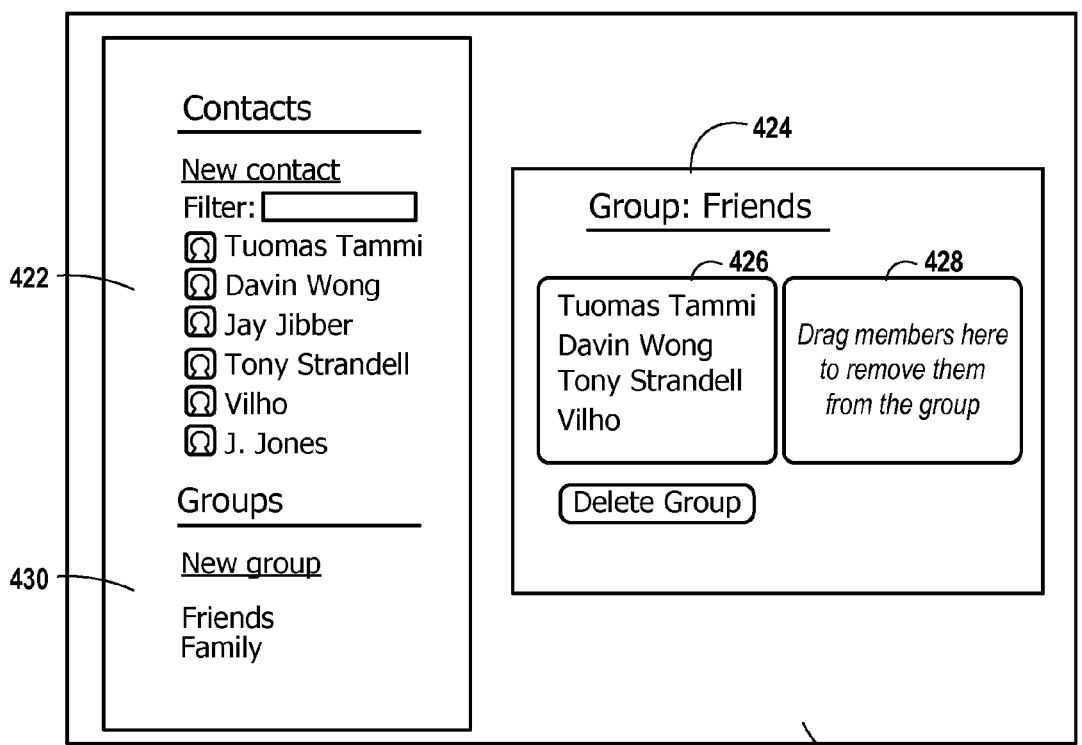
FIG. 4B is a diagram illustrating a shared group management user interface according to an embodiment of the invention.

In reference now to FIG. 4B, a Web interface screen 420 shows an example Web-based contact and group management screen according to an embodiment of the invention. A contacts panel 422 lists the current contacts maintained by this user. The contacts 422 may be synchronized with a contact list on the user's mobile device, such as a cell phone, PDA, portable media player, etc. The user may form groups using groups pane 424. In this example, a list box 426 shows the current member of the group "Friends." This box 426 may be populated by dragging names into the box 426, selecting names from another screen (e.g., a screen selection boxes next to each name from the contacts panel 422), typing in names, etc. Similar methods may be used to remove or change the listing in the box 426. For example, a name may be dragged from the member box 426 to a deletion box 428 to remove a member from the list.

A groups pane 430 lists the current groups being maintained by the user, and may act as en entry point for group creation/editing/deleting panels (pane 424). The ability to change group membership or delete the group in some cases may be limited to only that person who created the group. However, such modification ability may be enabled for more than one member and/or transferred to another member. The user may also be able to select groups from this pane 430 in order to view media that has already been shared between this group. Other members of the group other than the one who created the group may be able to share to the group, such that group media comes from more than one source.

One aspect of being a member of a media sharing group as described herein involves receiving update notifications when a member of the group has media to share. The notification messages may be sent each time new media items are shared to a person, if the person has not disallowed the notifications. The frequency and content of the messages may also be user configurable. For example, recipient may choose a minimum interval between subsequent sharing messages (e.g., no more than once per day) and multiple messages received during that interval can be aggregated into a single message. The recipient may also be able to place other filters on the notifications, including maximum size, time of day, originator of the notification, etc.

The notification message can be sent by an electronic medium based on data contained within the contacts database used by a member of the sharing service. For example, if the user's contact entry contains an email address and a number capable of receiving an SMS, one of these can be used as a target address for the notifications. If the contact entry of a person does not contain email, or mobile phone number, such person may not receive electronic notifications of shared media. However, it may be possible to arrange automatic notifications for such a person. For example, a family Web photo album may contain photos of interest to far-flung family members, some of which do not have regular access to email. However, those members without email may have postal addresses in a group member's contacts list. Therefore those members may choose to have a paper notification automatically mailed to them instead. Generally, this would incur the cost of printing the notification and postage, so either the sharing party or recipient may have to pay for this service.

Where a person receiving notifications has two or more target addresses for electronic notification, the system may be configured to choose the least disruptive notification medium. For example, a recipient may be unregistered, yet have multiple communication addresses stored in the sharing system due to that person being in the contact lists of one or more other users. The system that sends out sharing notifications to the recipient can use any of these communication addresses, and may be configured to use the least disruptive means by default, or based on user input. As new communications addresses are added, the system may be configured to automatically test to see if the newly added notification method is less disruptive than current notification method, and change communication methods if appropriate. Even if the person sharing the media does not have the least disruptive address of contacts in their own contact lists, the notifications originating from that person may be sent out using the least disruptive method due to the relevant contact data being provided by others who also use the system.

Figure 5:
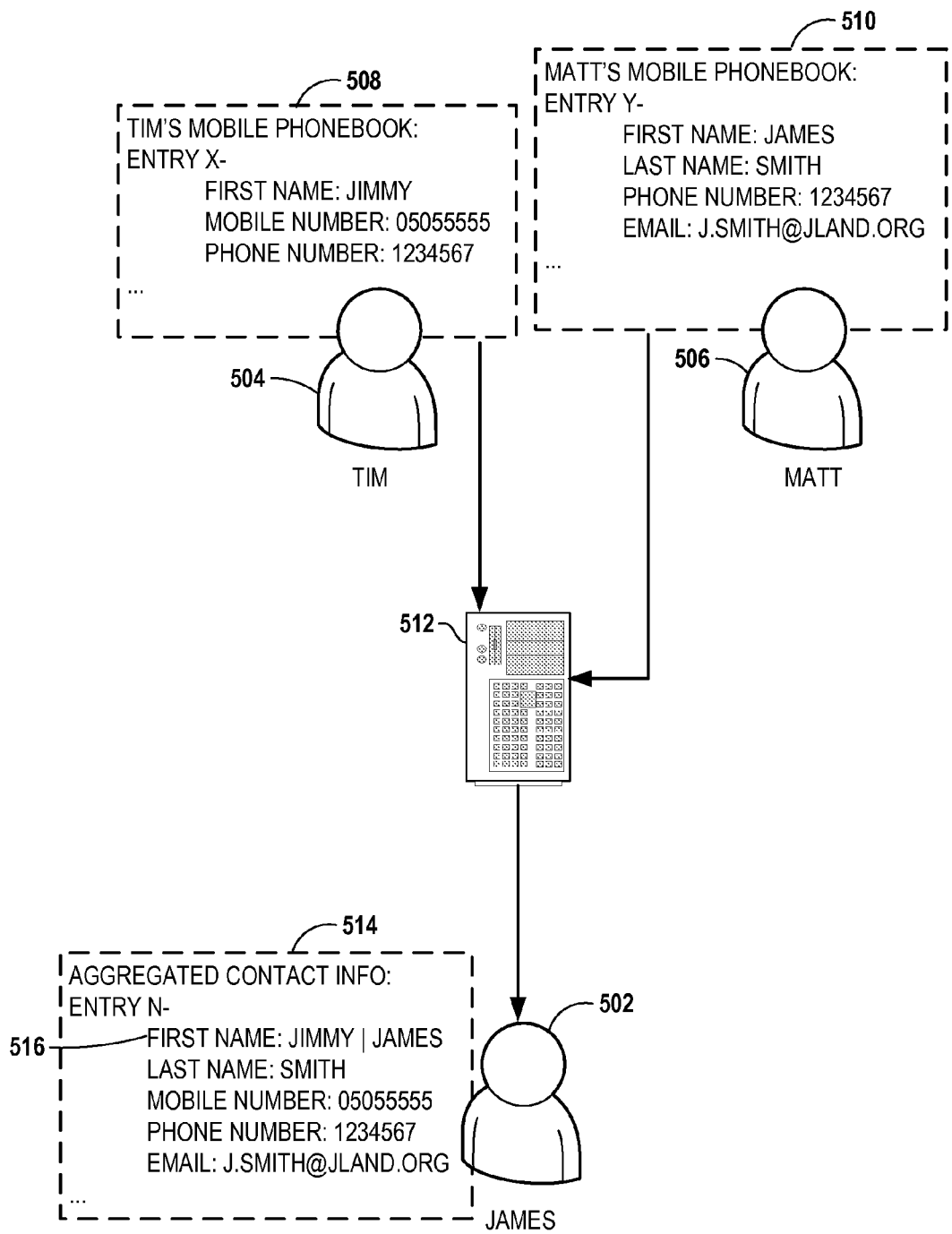
FIG. 5 is a block diagram illustrating an example of contact aggregation according to an embodiment of the invention.

In reference now to FIG. 5, a block diagram illustrates the creation of aggregated contact data for share notification recipients according to an embodiment of the invention. As stated above, in a case where several registered people have the same person in their contact book, they might have different contact information available from a particular person. In the illustrated example, person 502 ("James") is an intended recipient of sharing events. Two other persons, Tim 504 and Matt 506 having James' contact data 508, 510 in their respective mobile phonebooks. The contact data in Tim's phonebook 508 include the nickname "Jimmy" to describe James 502, and includes two phone numbers for James 502. The contact data in Matt's phonebook 510 include the proper full name "James Smith" to describe James 502, and includes one phone number and an email address for James 502.

Both Tim 504 and Matt 506 can share media items with James 502 via an apparatus 512 that hosts a media sharing service. Notifications regarding the media items shared by the Tim 504, who has phone number and mobile number in his contacts 508, can also be sent via email (or SMS), since the two contact entries are matched to the same person based on the phone number. This can be done automatically by the system, as email is generally considered less disruptive as SMS. Alternatively, James 502, who has multiple contact entries pointing to him, can select a preferred communication method/address to be used by all notification messages. The preferred contact details are not communicated or compromised to the other users 504, 506.

The person receiving the notification messages (e.g., James 502) can select the preferred method for receiving future notifications after receiving the first message. He can also provide a contact detail to be used even if none of the contacts contain it. For example, the recipient can provide an email address to be used even if all the contacts only contain mobile number or a different email address than the one(s) desired for use by the recipient (e.g., the recipient can provide the system with an email address that is not present in the contact entries of the registered users such as users 504, 506). Generally, the recipient 502 can change these preferences by way of sharing code received with the first notification message. The sharing code allows the recipient 502 to access shared media via a Web site (see, e.g., access interface 300 in FIG. 3) and may also allow the user to change preferences and/or register with the system.

In the illustrated example, the individual contact records 508, 510 associated with the target recipient are different. This is a typical case, as such contact information is often entered by hand (or transferred from another program) by the owner of the device that stores the data 508, 510. When the contact data 508, 510 is entered into the service 512, a matching algorithm is run to correlate the data 508, 510 and determine that it belongs to the same person 502. In this example, both sets of data 508, 510 include the same phone number, and so the two records 508, 510 can be automatically matched.

After the records 508, 510 are matched, they (and any other matched records) can be aggregated into a single contact data entry 514. Any matching data (e.g., phone number in this example) can be added to the record 514 without alteration, as is any data in one contact record 508, 510 and not the other (e.g., mobile phone number, email address). Some data, such as first name in this example, may be present in both records but have different values. Generally, the system will assume both of these values are valid and store them as alternates, as indicated in line 516. The same can be done to semi-duplicate contact entries in an address book as long as the entries have some mergeable differences in the fields. For example, the system may be able to merge commonly abbreviated entries, so that an entry such as "123 S. Main Street" could be seen as identical to "123 South Main St." even though the addresses contain different text. In such a case, the system may identify both entries using a common format, such as "123 South Main Street." Alternatively, the system may merge these two addresses into a single entry, but include both types of abbreviated and non-abbreviated text, such as "123 S.|South Main Street|St." Such merging operations may be performed on other address data, such as phone numbers that use different separators (e.g., "." versus "-" and/or no separator at all), email addresses (e.g., various mixtures of lowercase and capital letters), etc.

The contents of the aggregated data 514 may be kept from other users 504, 506 of the service 512. However, depending on the nature of the service 512 and/or the preferences of the person 502 to which the aggregated 514 data pertains, the aggregated contact data 514 could be shared with the other users 504, 506. Such an arrangement would be useful to ensure the contact data 508, 510 of registered users 504, 506 is correct and current. Also, synchronization between the individual contact records 508, 510 and the aggregated record 514 may be a convenient way for the user 502 to make changes in all contact lists of other users 504, 506. For example, when the user 502 change email providers, the user's email address typically changes. This is usually dealt with by the user 502 sending an email to other users 504, 506 notifying them of the change, and those users 504, 506 must manually update their contact data 508, 510, assuming that they ever get around to it. In contrast, if the user 502 knows that the contact lists 508, 510 are synchronized to the aggregated data 514, the user 502 may simply delete the old email address and add the new email address from the aggregated data 514 via the service 512. The contact address of the users 504, 506 will be automatically updated in response.

The service 512 may or may not allow registered users 504, 506 to see aggregated contact data 514 pertaining to another user 502. However, the person 502 to which the aggregated data pertains may wish to (and should be allowed to) access the data 514. For example, the person 502 may later wish to register with the service 512. In such a case, the aggregated data 514 can be used to pre-fill a registration form. In reference now to FIG. 6, a block diagram illustrates an example of a pre-filled registration screen 600 using aggregated contact information according to an embodiment of the invention.

Figure 6:
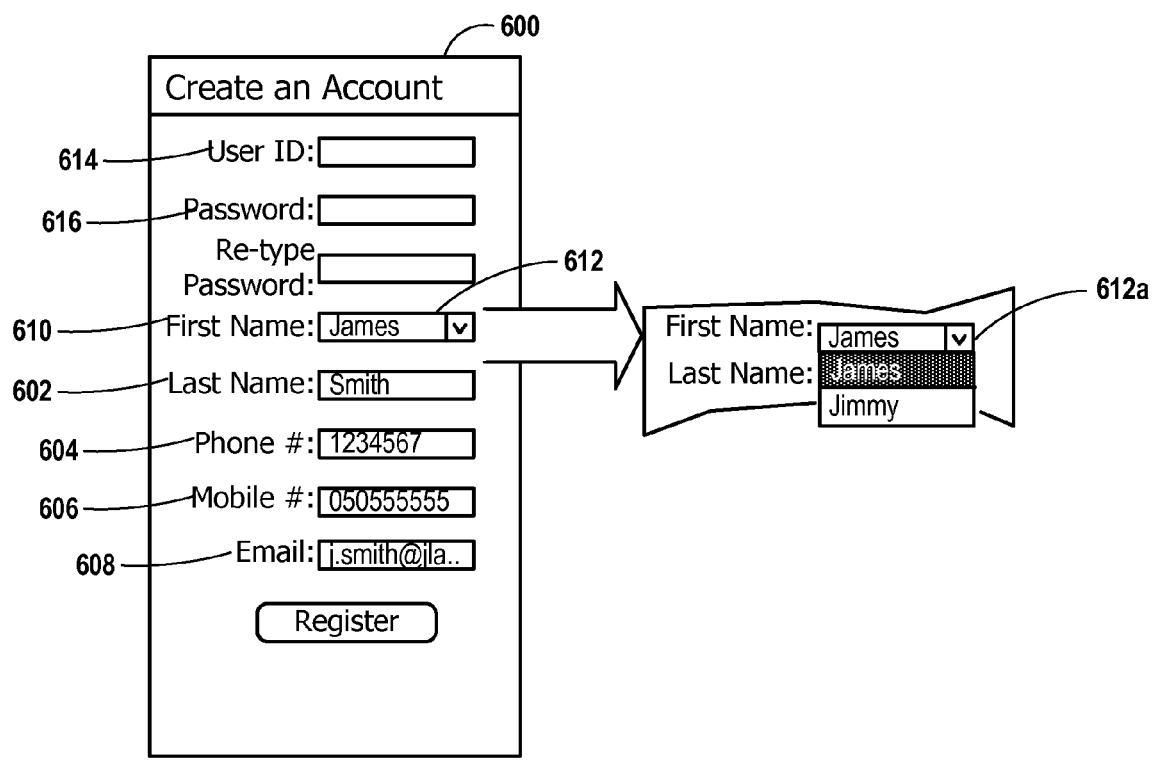
FIG. 6 is a diagram illustrating a pre-filled registration user interface according to an embodiment of the invention.

The screen 600 is pre-filled with contents of the aggregated contact data 514 shown in FIG. 4. In that example, there were single data entries that were used to fill in entries such as last name 602, phone number 604, mobile phone number 606, and email 608. However, the aggregated record 514 had two different data values for the first name, as seen here in entry 610, which includes a selection component 612 instead of a text box. In such a case, the user may have the opportunity to choose from one of a plurality of values for the entry. When component 612 is selected (shown in selected configuration 612a), it can be seen that either of the optional first names from the aggregated data set may be selected for use in the registration. The component 612 may also be configured to allow the user to type in another entry should none of the available selectable options 612a be correct or desirable. In the examples of FIGS. 5-6 the aggregation has been formed from two separate contact entries, but there is no limit to the number of contact entries used in aggregation.

The person registering can either choose, if the service at hand requires, a username (user id) and a password, as represented by fields 614 and 616. Those values 614, 616 can alternatively be generated by the system. The mobile number 606 and email address 608 can be verified as belonging to the user by sending verification codes as an SMS to the mobile number 606 and as email to the email address 608. The person then needs to provide these codes to the system to verify the correctness and accessibility of the mobile number 606 and the email address 608.

The described invention significantly enhances the user experience of Web-based services that enable interaction with persons that the user already knows, such as sharing images or other media items with family and friends. One advantage is that the user can utilize his/her existing contact information without taking any actions. Users can share media with their contact information without worrying whether the people being shared to are registered users or not. People being shared to can see media shared to them without registering or keeping track of multiple pass codes or cryptic URIs. Users can easily and repeatedly share media with a group of contacts without caring about registration status. Users can choose the least-disruptive way of receiving notifications. The least disruptive contact method can be used by all current and future notifications, even when the contact information used to identify the receiver of the notification does not contain the preferred contact information. Privacy of the receiver is not compromised. The email address of the receiver is not compromised, even though all the notifications are sent via email. For example the other users will not be notified of the email address. Registering one to the system is very easy. When a contact is deleted from an address book, the associated aggregated data which is solely derived from the deleted contact can also be purged from the system. The system may only keep aggregated data around as long as the contact sources for the aggregation are present.

Figure 7:
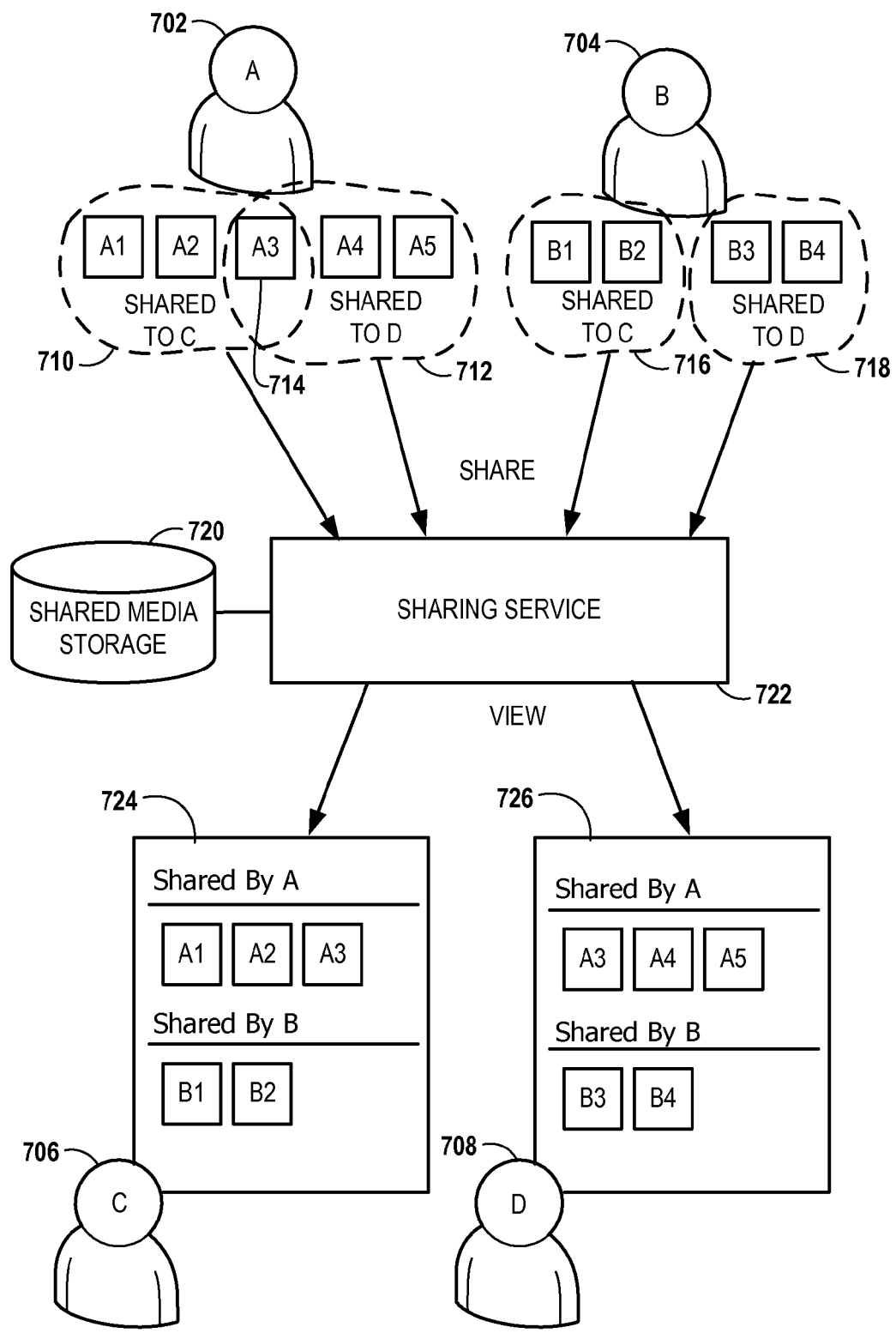
FIG. 7 is a block diagram illustrating the formation of shared media documents according to an embodiment of the invention.

Generally, a system according to embodiments of the invention allows users to create at least part of a custom Web page (or other media object) for a particular person. Such a Web page can be populated with selected media items that are shared by other users. In reference now to FIG. 7, a block diagram shows an example of shared media views according to an embodiment of the invention. Two users, 702 and 704, are actively sharing items to two other users 706, 708. User 702 is sharing group 710 of media items to user 706 and is sharing group 712 of media items to user 708. Note that media item 714 is included in both groups 710, 712, and in general any media item may be included in any number of groups at the same time. Similarly, user 704 is sharing group 716 to user 706 and group 718 to user 708.

The media items that make up the groups 710, 712, 716, and 718 may be centrally stored on a shared media data store 720 via a sharing service 722. The media items placed on the shared media data store 720 may be processed by the service to ascertain whether it meets certain requirements, such as minimum/maximum size, contains allowable content, etc. Other metadata may also be associated with the stored media 720, including the identity of the original submitter, identities of other users shared to or otherwise allowed access, descriptive text/labels added by the submitter, etc.

When at least one sharing event is directed to users 706, 708, they can access a network document that was created just for them, regardless of whether the users 706, 708 are registered users of the service 722. In this example, user 706 can access document 724, and user 708 can access document 726. Both of these documents 724, 726 contain media items shared by users 702 and 704, but will appear differently to the respective viewers 706, 708 because users 702 and 704 chose to share different items to those users 706, 708.

Although the documents 724, 726 can be static (e.g., prepared in full and stored after a sharing event), more typically the documents would be dynamically generated. Further, even though shared media items may appear in the Web pages and/or documents of multiple system users 702, 704, 706, 708, the system 722 only needs to keep a single copy of any particular media item in storage 720, and provide a reference to the single copy in the documents 724, 726. In such a case, the generated documents 724, 726 may have links to the storage location of the media items. However, the system 722 may want to place media items into the documents 724, 726 using something other than hyperlinks that point to media pathnames in order to prevent users from accessing media items 720 to which they were not shared. For example, users may view pathnames for media they are authorized to see, and use those pathnames to guess other pathnames. The unauthorized user may be able to view the media by typing in the guessed URLs into a browser. In order to prevent this, stored media 720 may be accessed by way of a script (e.g., using ASP or PHP server side scripting) so that the user's authorization to view the media items can be verified before any media is placed in a document 724, 726. This may be implemented, for example, by inserting a reference to the script in a hyperlink instead of the pathname of the media items 720, and the script returns the media item if the user is authorized.

Many types of apparatuses may be used for media sharing activities as described herein. Mobile devices are particularly useful for such placements because their portability and advanced capabilities results in these devices becoming the primary means of network access for many users. Further, these devices may be used to create the shared media (e.g., via a built in camera) so having access to the sharing functions in such devices is convenient. In reference now to FIG. 8, an example is illustrated of a representative mobile computing arrangement 800 capable of carrying out operations in accordance with embodiments of the invention. Those skilled in the art will appreciate that the exemplary mobile computing arrangement 800 is merely representative of general functions that may be associated with such mobile devices, and also that landline computing systems similarly include computing circuitry to perform such operations.

The processing unit 802 controls the basic functions of the arrangement 800. Those functions associated may be included as instructions stored in a program storage/memory 804. In one embodiment of the invention, the program modules associated with the storage/memory 804 are stored in non-volatile electrically-erasable, programmable read-only memory (EEPROM), flash read-only memory (ROM), hard-drive, etc. so that the information is not lost upon power down of the mobile terminal. The relevant software for carrying out conventional mobile terminal operations and operations in accordance with the present invention may also be transmitted to the mobile computing arrangement 800 via data signals, such as being downloaded electronically via one or more networks, such as the Internet and an intermediate wireless network(s).

The mobile computing arrangement 800 may include hardware and software components coupled to the processing/control unit 802 for performing network data exchanges. The mobile computing arrangement 800 may include multiple network interfaces for maintaining any combination of wired or wireless data connections. In particular, the illustrated mobile computing arrangement 800 includes wireless data transmission circuitry for performing network data exchanges.

This wireless circuitry includes a digital signal processor (DSP) 806 employed to perform a variety of functions, including analog-to-digital (A/D) conversion, digital-to-analog (D/A) conversion, speech coding/decoding, encryption/decryption, error detection and correction, bit stream translation, filtering, etc. A transceiver 808, generally coupled to an antenna 810, transmits the outgoing radio signals 812 and receives the incoming radio signals 814 associated with the wireless device. These components may enable the arrangement 800 to join in one or more networks 815, including mobile service provider networks, local networks, and public networks such as the Internet.

The mobile computing arrangement 800 may also include an alternate network/data interface 816 coupled to the processing/control unit 802. The alternate network/data interface 816 may include the ability to communicate via secondary data paths using any manner of data transmission medium, including wired and wireless mediums. Examples of alternate network/data interfaces 816 include USB, Bluetooth, Ethernet, 802.11 Wi-Fi, IRDA, etc. These alternate interfaces 816 may also be capable of communicating via the networks 815, or via direct peer-to-peer communications links.

The processor 802 is also coupled to user-interface elements 818 associated with the mobile terminal. The user-interface 818 of the mobile terminal may include, for example, a display 820 such as a liquid crystal display and a transducer 822. The transducer 822 may include any sensing device capable of creating sharable media, such as any combination of text, still pictures, video, sound, etc. Other user-interface mechanisms may be included in the interface 818, such as keypads, speakers, microphones, voice commands, switches, touch pad/screen, graphical user interface using a pointing device, trackball, joystick, vibration generators, etc. These and other user-interface components are coupled to the processor 802 as is known in the art.

The program storage/memory 804 typically includes operating systems for carrying out functions and applications associated with functions on the mobile computing arrangement 800. The program storage 804 may include one or more of read-only memory (ROM), flash ROM, programmable and/or erasable ROM, random access memory (RAM), subscriber interface module (SIM), wireless interface module (WIM), smart card, hard drive, or other removable memory device. The storage/memory 804 of the mobile computing arrangement 800 may also include software modules for performing functions according to embodiments of the present invention.

In particular, the program storage/memory 804 includes a sharing user interface 824 that may facilitate the sharing of locally stored media 826 and/or locally generated media, such as media created via the transducer 822. The sharing user interface 824 may detect media by way of a media manager 828 which generally guides the user in creation, storage, and management of media items. The sharing user interface 824 may also interact with a contacts manager 830 for defining groups of individuals to whom which media may be shared.

Generally, the contacts manager 830 may allow users to create, import, edit, and store contact data, such as in a local contacts database 832. The contacts manager 830 may keep local records of sharing groups, and/or assist in uploading the contacts data 832 (including data used to define sharing groups) to a network accessible media sharing service 834. The media sharing service 834 tracks groups of contacts for purposes of sharing media, and may include data that mirrors the local contacts data 832.

The mobile device 800 may access media sharing service 834 via a sharing service interface 836. This interface 836 may provide a standardized way for programs to manage both contacts and media stored on the network service 834. Some functions of the interface 836 may also be accessed directly from the service 834, such as accessing configuration pages via a Web browser. The various sharing functions 824, 828, 830, 840 may be provided as separate software components (e.g., libraries, data objects, executable tasks) or be part of a single program. Other applications on the mobile device 800 may also be able to utilize this sharing service functionality by way of a plug-in application program interface (API) 838. The API 838 may be configured to be in conformance with plug-ins of a known program, so that the functionality of the sharing UI 824, media manager 828, contacts manager 830, and service interface 836, can be added to another program such as a browser or media editor. The APT 838 may also be specific to the sharing software components 824, 828, 830, 836 such that other vendors can write programs that use the components.

The software 804 included on the mobile device 800 can seamlessly integrate sharing capability into other functions that may or may not already be included on the device 800. For example, if the transducer 822 is a digital camera, the media manager 828 allows the user to take and store pictures to permanent storage 826. After taking a picture, the picture may be shown on the display 820 and the user is given option (e.g., via the sharing UI 824) to discard, save, save to media service 834, and/or to share to somebody else via the media sharing service 834. One option may be to "Share to Family" When this option is selected, the picture is uploaded to the service 834 and associated with contact data of the "Family" group. Once the picture is uploaded to the service 834, notifications are sent out via the service 834 using a notification method discovered from this or other contact data.

Figure 8:
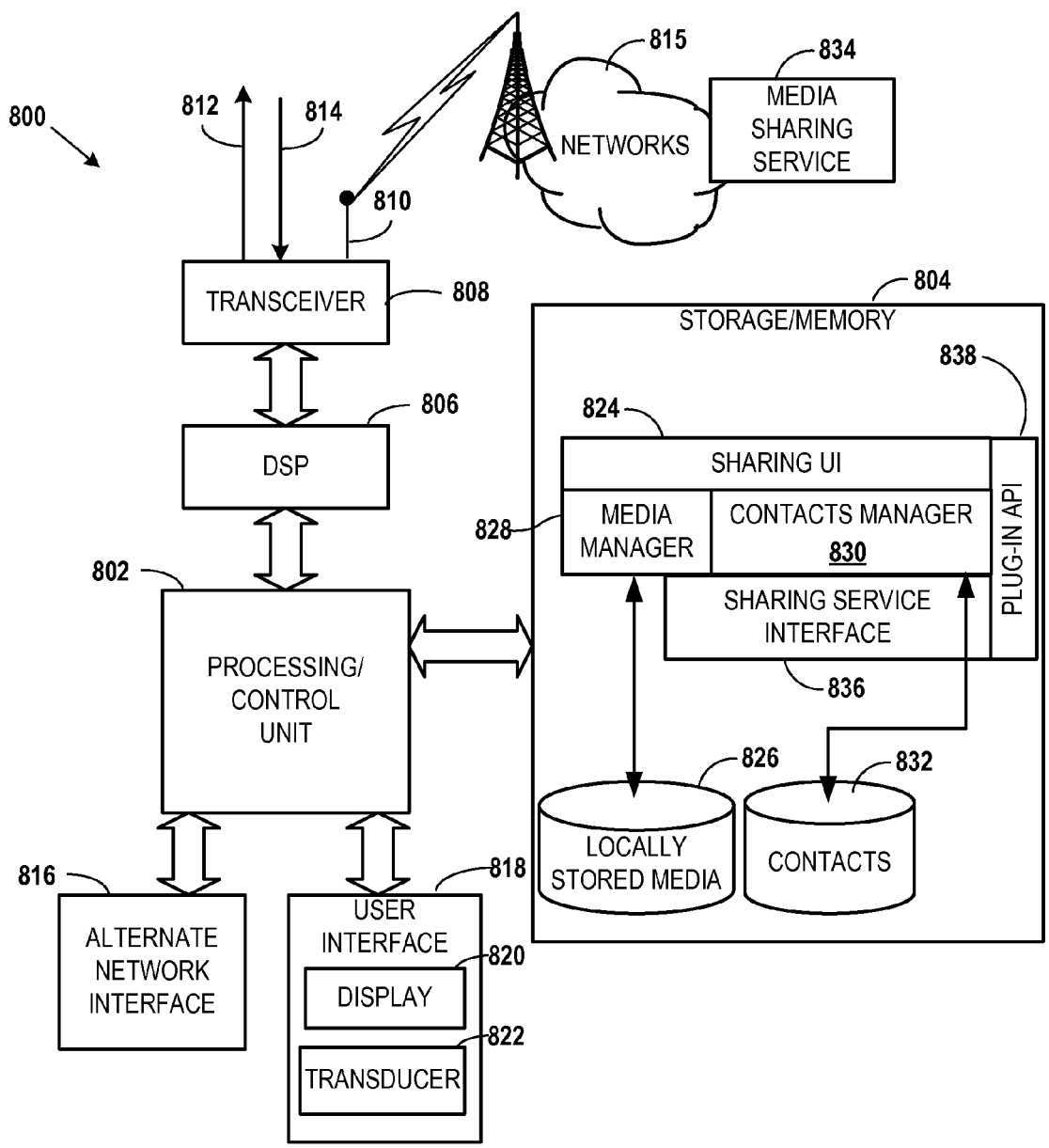
FIG. 8 is a block diagram of a mobile device according to an embodiment of the invention.

The mobile computing arrangement 800 of FIG. 8 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Figure 9:
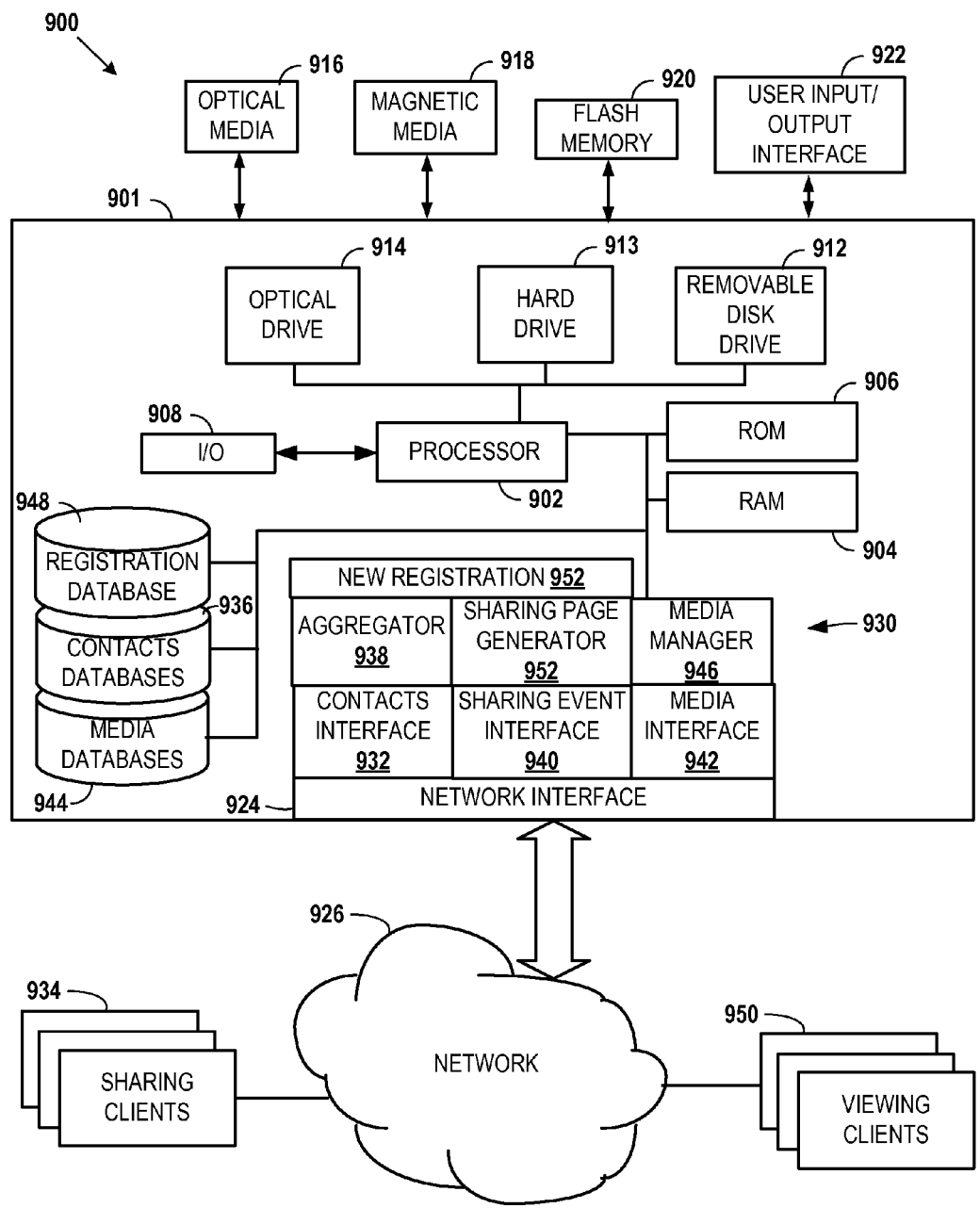
FIG. 9 is a block diagram of a server device according to an embodiment of the invention.

In reference now to FIG. 9, a block diagram provides details of a sharing service 900 according to an embodiment of the invention. The service 900 may be implemented via one or more conventional computing arrangements 901. The computing arrangement 901 may include custom or general-purpose electronic components. The computing arrangement 901 includes a central processor (CPU) 902 that may be coupled to random access memory (RAM) 904 and/or read-only memory (ROM) 906. The ROM 906 may include various types of storage media, such as programmable ROM (PROM), erasable PROM (EPROM), etc. The processor 902 may communicate with other internal and external components through input/output (I/O) circuitry 908. The processor 902 carries out a variety of functions as is known in the art, as dictated by software and/or firmware instructions.

The computing arrangement 901 may include one or more data storage devices, including removable disk drives 912, hard drives 913, optical drives 914, and other hardware capable of reading and/or storing information. In one embodiment, software for carrying out the operations in accordance with the present invention may be stored and distributed on optical media 916, magnetic media 918, flash memory 920, or other form of media capable of portably storing information. These storage media may be inserted into, and read by, devices such as the optical drive 914, the removable disk drive 912, I/O ports 908 etc. The software may also be transmitted to computing arrangement 901 via data signals, such as being downloaded electronically via a network 926, such as the Internet. The computing arrangement 901 may be coupled to a user input/output interface 922 for user interaction. The user input/output interface 922 may include apparatus such as a mouse, keyboard, microphone, touch pad, touch screen, voice-recognition system, monitor, LED display, LCD display, etc.

The service 900 is configured with software that may be stored on any combination of memory 904 and persistent storage (e.g., hard drive 913). Such software may be contained in fixed logic or read-only memory 906, or placed in read-write memory 904 via portable computer readable storage media such as read-only-memory magnetic disks, optical media, flash memory devices, etc. The software may also placed in memory 906 by way of data transmission links coupled to input-output busses 908. Such data transmission links may include wired/wireless network interfaces, Universal Serial Bus (USB) interfaces, etc.

The software generally includes instructions that cause the processor 902 to operate with other computer hardware to provide the service functions described herein. The computing arrangement 901 may be coupled to other computing devices via networks. In particular, the computing arrangement includes a network interface 924 for interacting with client and server entities via a network 926. The network interface 924 may include a combination of hardware and software components, including media access circuitry, drivers, programs, and protocol modules.

For purposes of illustration, the operation of the service 900 is described in terms of functional circuit/software modules that interact to provide particular results. Those skilled in the art will appreciate that other arrangements of functional modules are possible. Further, one skilled in the art can readily implement such described functionality, either at a modular level or as a whole, using knowledge generally known in the art.

The computing arrangement 901 includes processor executable instructions 930 for carrying out tasks of the service 900. These instructions include a contacts interface 932 capable of communicating with sharing client applications 934 for purposes of receiving contact data stored by the clients 934. Such data can be stored in a contacts database 936 of the service 900. An aggregator component 938 may be adapted to analyze contact data received from the client applications 934, correlate matching contacts that may be in multiple users' contact data, and create an aggregated contact record in the database 936 for all correlated and aggregated records.

A sharing event interface 940 and media interface 942 may also receive data from the client applications 934 related to particular media items. The sharing event interface 940 may receive notifications from the clients 934 that a particular media is to be shared. The media item to be shared can be received via the media interface 942 contemporaneously with sharing events received via the event interface 940, or the media and sharing requests may be disjoint events. Generally, events received via the event interface 940 will include a description of the media to be shared (e.g., a location in a media database 944) and one or more contacts to whom sharing notifications are to be sent (e.g., via a reference to the contacts database 936). The service 900 may include a media manager 946 to process media items uploaded by the client applications 934. The media manager 946 may check incoming media items for data integrity and for compliance with content requirements, and store the media in the media database 944.

Generally, in order to upload contact data and media data, the users of the client applications 934 will be registered with the service, as represented by registration database 948. The registration status of a user may be checked anytime a client application 934 utilizes one of the service interfaces 932, 940, 942. The service 900 may also be offered to users who may or may not be registered with the service 900, as represented by viewing clients 950. The viewing clients 950 may include one or more standard applications that can receive sharing event notification and/or allow a user to view media. The sharing event interface 940 may also communicate with these viewing clients 950, such as by sending share event notifications to an address accessible by the clients 950 as determined via the contacts database 936.

The viewing clients 950 may allow an unregistered user to receive sharing event notifications, as well as facilitate the viewing of shared media items. Even though the user does not explicitly register, a pseudo account is set up for the user, and they may be able to view the shared media via an access code. A sharing page generator component 952 may be able to determine what media is shared to a use corresponding to an access code (e.g., via data stored in the contacts and media databases 936, 944), access the shared media via the media database 944, and create a document using the shared media that the client 950 can view (e.g., as an HTML document).

At some point, an unregistered user may wish to register with the service 900. If another user has already shared media to the user, then the unregistered user's contact data may already have been processed by the aggregator component 938 and may be in the contacts database 936. Therefore, a new registration module 952 may provide a document accessible via a standard client application (e.g., viewing client application 950) for registration. The registration document may be pre-filled with contact data from the contacts database 936, and after registration the user's status as a registered user may be recorded in the registration database 948.

The computing structure 900 is only a representative example of network infrastructure hardware that can be used to provide location-based services as described herein. Generally, the functions of the computing structure 900 can be distributed over a large number of processing and network elements, and can be integrated with other services, such as Web services, gateways, mobile communications messaging, etc.

Figure 10:
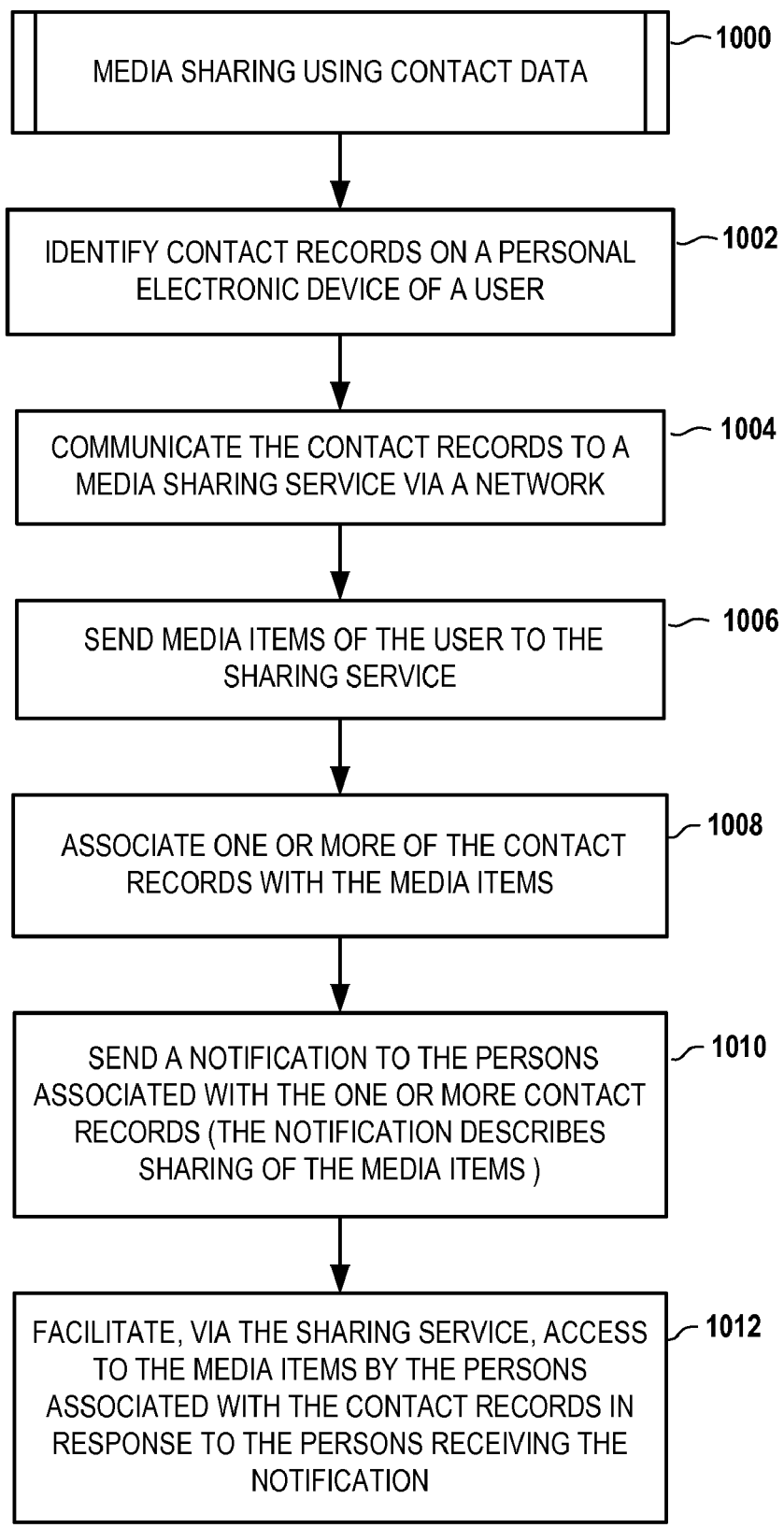
FIG. 10 is a flowchart illustrating a method for media sharing using contact data according to an embodiment of the invention.

In reference now to FIG. 10 a flowchart illustrates a procedure 1000 for media sharing using contact data according to an embodiment of the invention. Contact records are identified 1002 on a personal electronic device of a user. Each of the contact records includes a contact address of a person associated with the respective contact record. The contact records are communicated 1004 to a media sharing service via a network. Media items of the user are sent 1006 to the sharing service. One or more of the contact records are associated 1008 with each of the media items. A notification is sent 1010 to the persons associated with the one or more contact records. The notification describes sharing of the media items associated with the contact records. The sharing service facilitates 1012 access to the media items by the persons associated with the contact records in response to the persons receiving the notification.

Figure 11:
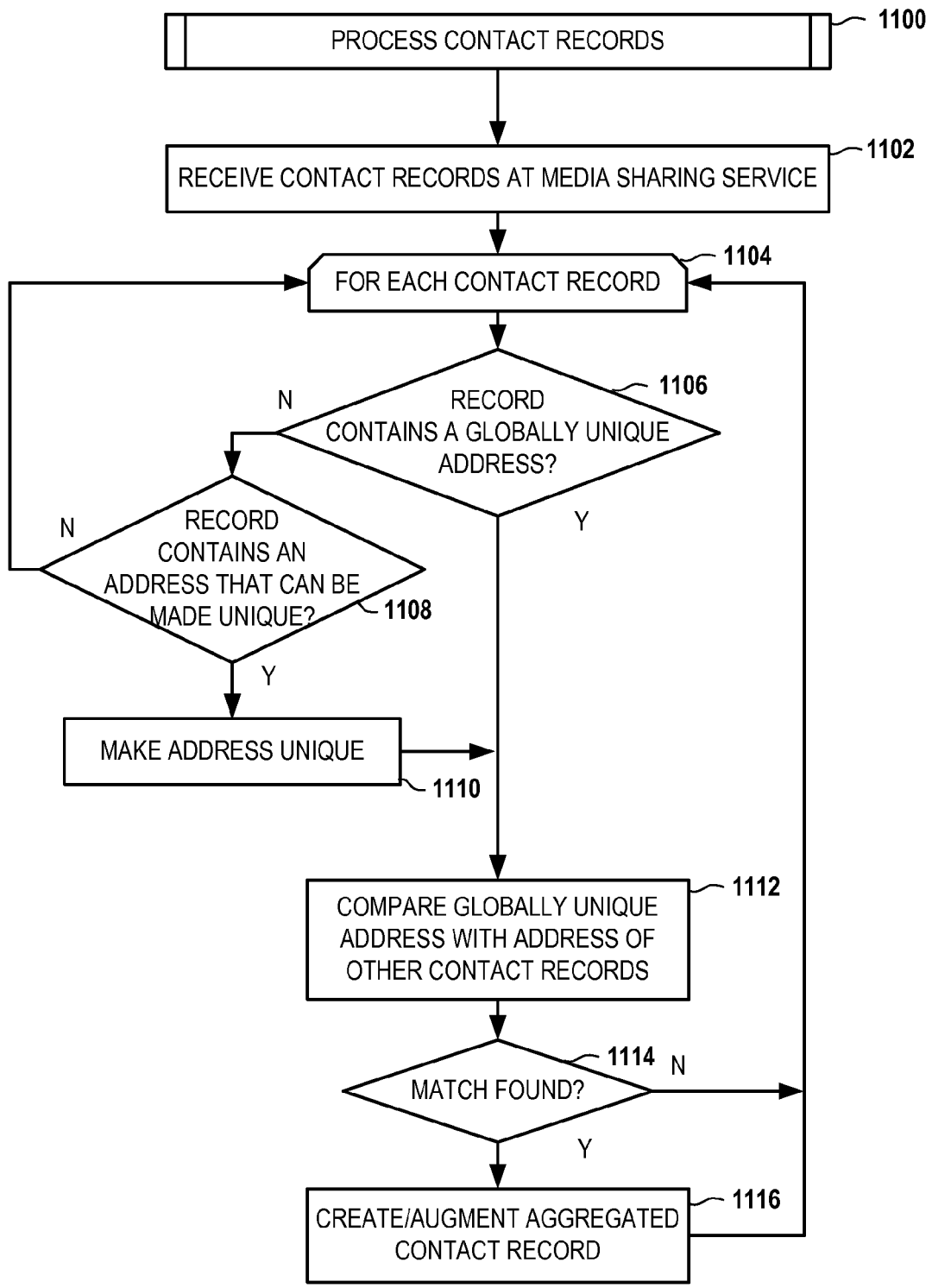
FIG. 11 is a flowchart illustrating a method for processing contact records at a sharing service according to an embodiment of the invention.

In reference now to FIG. 11 a flowchart illustrates a procedure 1100 for processing contact records by a media sharing service according to an embodiment of the invention. Contact records are received 1102 at the media sharing service. A loop 1104 processes each of the contact records. It is determined 1106 whether each contact record has a globally unique address. If not, the contact record is examined to determine 1108 whether any addresses are included that may be made globally unique. If so, then the address is made unique 1110. For example, a phone number may be made unique 1110 by pre-pending a country code and/or area code. In another example, some systems may allow email addresses to include a username only (or username with non-fully qualified hostname), and will assume the domain of the email is the same as the contact keeper's domain. As such, an email address may be made globally unique 1110 by adding a fully qualified domain name of the mail host. If it is determined 1108 that a contact record does not have an address that can be made globally unique, the next record is selected 1104.

For all records having a globally unique address, a comparison 1112 can be performed with other records. If a match is found 1114 (e.g., two contact records have the same address) an aggregated record can be created or augmented 1116 using the contact data. This augmented contact data may include two or more addresses for sending sharing notifications. A sharing service can examine both of these addresses when sending out sharing notifications, and can select the least disruptive of the two or more addresses. Thereafter, notifications can be sent via the least disruptive notification method.

Although the illustrated procedure 1100 deals with contact records having globally unique addresses, even records that do not have a globally unique address may still be stored by the service on behalf of the user, and notifications may still be sent out by other methods (e.g., by postal mail). Alternatively, if it is determined 1108 that the contact record does not have a single, globally unique address, the system may perform other processing (not shown) on the data in an attempt to find matches. For example, the system may attempt to parse and match names, postal addresses, company names, and other descriptive data in an attempt to match the contact with other stored data. In such a case, the system will perform the additional processing, and the aggregation 1116 may still be performed even though one or both of the records do not have a globally unique address. Further, even when a match is not found, the contact data can still be stored on behalf of the user and can be used in future matching.

It will also be appreciated that the procedure 1100 may be performed on initial use of the service, such as when a registered user first uploads 1102 their contact data. The procedure 1100 may then be repeated the user changes the data locally, such as by adding or changing a communications address, and such changes may be sent to the service by way of data synchronization. In this way, the aggregated data will be continually updated by all users who participated in initially forming 1116 the aggregated data.

The foregoing description of the exemplary embodiments of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather determined by the claims appended hereto.

What is claimed is:

1. A method, comprising:
   receiving media items of a registered user of a sharing service to be shared via the sharing service;
   receiving contact information of a personal device of the registered user, wherein the contact information relates to a person who is not registered with the sharing service;
   sending an electronic notification that describes sharing of the media items to the person to whom the contact information is related, wherein the electronic notification includes an access code unique to the person; and
   facilitating, via the sharing service, access to the media items by the person based on the access code without requiring registration by the person with the media service, wherein the access code further allows the person to access other content on the sharing service shared to the person by other registered users of the sharing service.

2. The method according to claim 1, further comprising:
   receiving a request to register the person with the media service; and
   in response, providing a pre-filled registration document to the person via a client application, wherein the pre-filled registration document is based, at least in part, on the contact information from the personal device of the registered user.

3. The method according to claim 1, further comprising:
   aggregating the contact information with other contact information that relates to the person who is not registered with the sharing service; and
   adding the aggregated contact information to a contacts database of the sharing service.

4. The method according to claim 3, wherein the contact information received from the personal device does not have a globally unique identifier, and wherein aggregating the contact information with other contact information comprises matching multiple descriptive data entries of the contact information to entries of the contacts database to determine the other contact information.

5. The method according to claim 3, wherein the aggregated contact information of the contacts database is kept from being accessed from the personal device of the registered user.

6. The method according to claim 3, wherein the aggregated contact information of the contacts database is synchronized with a contacts database of the personal device of the registered user.

7. The method according to claim 6, wherein the aggregated contact information of the contacts database is synchronized with contacts databases of multiple other registered users who associate with the person.

8. The method according to claim 3, further comprising allowing the person to update the aggregated contact information of the contacts database that relates to the person.

9. The method according to claim 1, wherein facilitating, via the sharing service, access to the media items by the person described by the contact information comprises creating a pseudo account for the person that does not require registration with the sharing service by the person.

10. A computer readable storage medium having instructions stored thereon that are executable by an apparatus to perform the method of claim 1.

11. An apparatus comprising
    at least one processor; and
    at least one memory including computer program code, wherein the at least one memory and the computer program code are configured to, with the at least one processor, cause the apparatus at least to:
    facilitate user access to a least one media item and contact information accessible via the apparatus, wherein the contact information relates to a person associated with a user of the apparatus;
    associate the contact information with the media item in response to a user input; and
    communicate, via a network, the contact information and the media item to a media sharing service to which the user is registered, wherein the person to whom the contact information is related is not previously registered with the media sharing service, and wherein communicating at least one of the contact information and the media item to the media sharing service causes: a) forming at least one notification comprising an access code that is uniquely associated with the person and that facilitates access by the person to the media item via the media sharing service; and b) sending the at least one notification to the person.

12. The apparatus according to claim 11, wherein communicating the contact information and media items to the media sharing service causes the media service to:
   aggregate the contact information with other contact information that relates to the person who is not registered with the sharing service; and
   add the aggregated contact information to a contacts database related to the sharing service.

13. The apparatus according to claim 12, wherein the at least one memory and the computer program code are further configured to, with the at least one processor, cause the apparatus to synchronize the aggregated contact information of the contacts database with a contacts database of the apparatus.

14. An apparatus comprising
   at least one processor; and
   at least one memory including computer program code, wherein the at least one memory and the computer program code are configured to, with the at least one processor, cause the apparatus at least to:
      receive a) media items of a registered user of a sharing service, to be shared via the sharing service; and b) contact information of a personal device of the registered user, wherein the contact information relates to a person who not registered with the sharing service;
      send an electronic notification that describes sharing of the media items to the person to whom the contact information is related, wherein the electronic notification includes an access code unique to the person; and
   facilitate, via the sharing service, access to the media items by the person based on the access code without requiring registration by the person with the media service, wherein the access code further allows the person to access other content on the sharing service shared to the person by other registered users of the sharing service.

15. The apparatus according to claim 14, wherein the at least one memory and the computer program code are further configured to, with the at least one processor, cause the apparatus to:
   aggregate the contact information with other contact information that relates to the person who is not registered with the sharing service; and
   add the aggregated contact information to a contacts database related to the sharing service.

16. The apparatus according to claim 15, wherein the contact information received from the personal device does not have a globally unique identifier, and wherein aggregating the contact information with other contact information comprises matching multiple descriptive data entries of the contact information to entries of the contacts database to determine the other contact information.

17. The apparatus according to claim 15, wherein the aggregated contact information of the contacts database is kept from being accessed from the personal device of the registered user.

18. The apparatus according to claim 15, wherein the aggregated contact information of the contacts database is synchronized with a contacts database of the personal device of the registered user, and wherein the aggregated contact information of the contacts database is synchronized with contacts databases of multiple other registered users who associate with the person.

19. The apparatus according to claim 18, wherein the at least one memory and the computer program code are further configured to, with the at least one processor, cause the apparatus to allow the person to update the aggregated contact information of the contacts database that relates to the person, thereby causing an update to the contacts database of the registered user and the multiple other registered users.

20. The apparatus according to claim 14, wherein facilitating, via the sharing service, access to the media items by the person described by the contact information comprises creating a pseudo account for the person that does not require registration with the sharing service by the person.

* * * * *